(No Model.) 2 Sheets—Sheet 1.
W. J. SMITH.
MACHINE FOR BORING AND SHAPING.
No. 473,027. Patented Apr. 19, 1892.
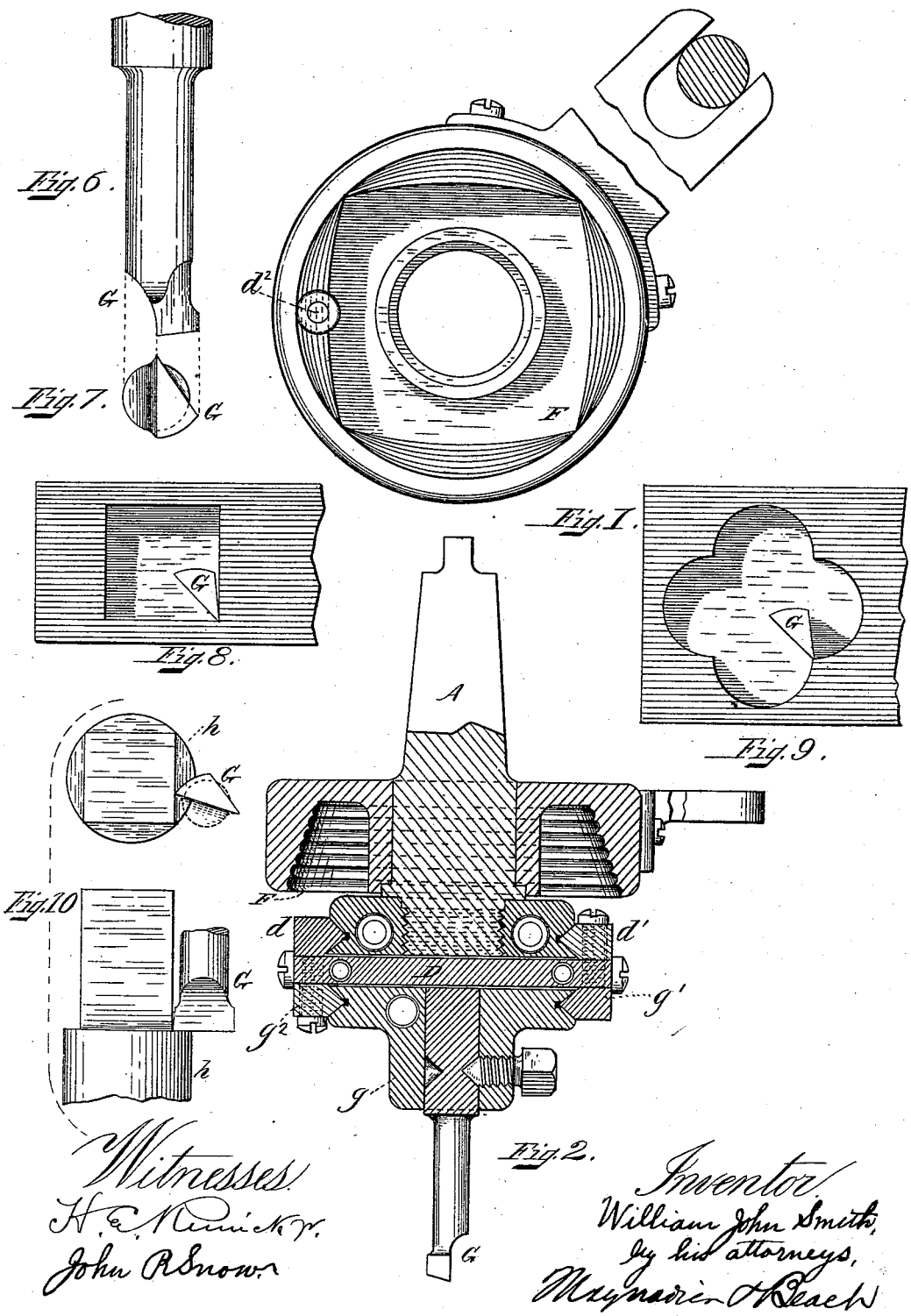

(No Model.) 2 Sheets—Sheet 2.
W. J. SMITH.
MACHINE FOR BORING AND SHAPING.
No. 473,027. Patented Apr. 19, 1892.
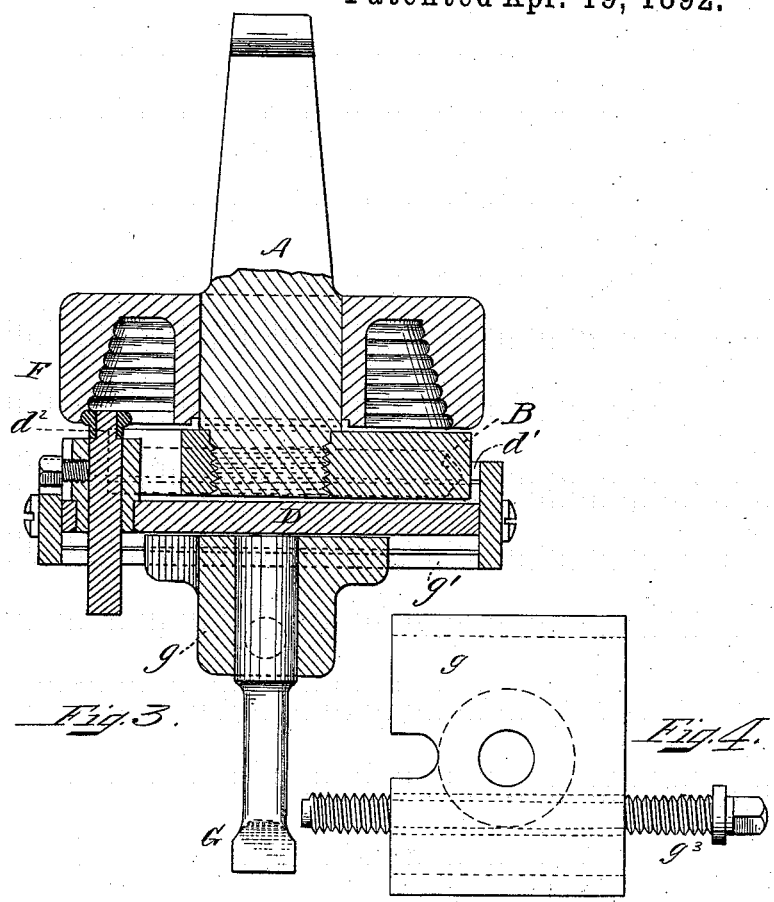

UNITED STATES PATENT OFFICE.

WILLIAM JOHN SMITH, OF BOSTON, MASSACHUSETTS, ASSIGNOR TO CHARLES S. LARRABEE, TRUSTEE, OF SAME PLACE.

MACHINE FOR BORING AND SHAPING.

SPECIFICATION forming part of Letters Patent No. 473,027, dated April 19, 1892.

Application filed December 9, 1891. Serial No. 414,504. (No model.)

*To all whom it may concern:*

Be it known that I, WILLIAM JOHN SMITH, of Boston, in the county of Suffolk and State of Massachusetts, have invented a new and useful Machine for Boring and Shaping, of which the following is a specification, reference being had to the accompanying drawings, in which—

Figure 1 is an under plan of one form of the guide for the tool-carriage. Figs. 2 and 3 are sections. Fig. 4 is a plan of the tool-holder. Fig 5 is a plan of the carrier.

My invention relates, primarily, to boring by means of a tool which has two motions, one a motion on its axis as usual in boring-tools and the other a motion with a carrier, the compounding of these two motions giving the size and shape of the hole bored when the path of the tool is such as to bore a hole; and it consists, primarily, in the combination of a tool-stock adapted to be rotated in any suitable way, a carrier compelled to rotate with the tool-stock, but adapted to move crosswise of the tool-stock while the stock is rotated, and a guide prevented from rotating and adapted to control the movement of the carrier across the tool-stock. The tool being fast to the carrier is thus compelled to rotate about the axis of the rotating tool-stock, instead of upon that axis, the rotating motion of the tool-stock and the crosswise motions of the carrier giving the tool a compound motion, with the result that circular or non-circular holes can be bored and pins be turned to fit such holes. Moreover, by adjusting the tool relatively to the axis of the tool-stock the size of the hole bored or pin turned will be varied, and by changing the relation of the cutting-edge of the tool to the guide the shape of the hole bored or pin turned will be varied.

The simplest form of my machine is a stock A, whose outer end is of usual construction, adapting it for the usual drilling or boring machine; but to the other end is secured a block B. In the drawings the block B screws upon the stock A. This block B supports the carrier D, which is so mounted upon block B that as block B rotates with stock A the carrier D can slide across the axis of rotation of stock A. The ways $d$ $d'$, fast to carrier D, fit in grooves in block B, and the way $d'$ is preferably adjustable on carrier D to allow for wear. A stud $d^2$, fast to carrier D, engages with guide F, which is preferably carried by stock A, but does not rotate with it. Guide F is shown as a cup with the outer end of stud $d^2$ traveling in it, the springs shown in dotted lines in Fig. 5 serving to insure contact between them, and the stud $d^2$ is provided with the usual anti-friction roll.

The operation of this the simplest form of my machine is as follows: The tool G, being secured in any convenient manner to carrier D, (the means shown need not be here considered, as they constitute another feature of my invention and are fully described below,) must move with carrier D, and as carrier D must rotate with stock A and block B a rotary motion of stock A causes tool G to rotate also. If now the grooves of guide F were concentric with the axis of stock A, carrier D would simply rotate with stock A and block B and be fed toward the work, as stock A and block B were so fed, and if the axis of tool G were in line with the axis of stock A it would be in substance the same as if tool G were secured directly to and in line with stock A and the tool would then be a simple boring-tool; but if the axis of tool G be slightly out of line with stock A the tool G will, while it revolves, move about the axis of stock A and bore a larger hole than it could bore if in line with stock A, or, if tool G be largely out of line with stock A, it will move in a longer path about the axis of stock A and may thus be made to cut a groove, instead of merely boring a hole. From this it will be clear that if the guide F be four-sided, as shown in the drawings, the motion of the carrier B will cause the tool G as it revolves to cut a four-sided hole, as illustrated in Fig. 8, and as will now be more fully explained by reference to that figure. When the cutting-edge of tool G gets to the position shown in Fig. 8, the axis of tool G is gradually moved as the tool rotates toward the axis of stock A by carrier D and guide F, thus causing the cutting-edge to follow one-half of one side of the square; but then the axis of tool G is gradually moved as the tool rotates away from the axis of stock A by carrier D and guide F, thus causing the cutting-edge to follow the other half of one side of the square until the outer end of the cutting-edge occupies the second corner of the square. In this way, with a properly-shaped guide, the axis of the tool is gradually moved toward and from the axis of the stock to bore the desired shape of hole.

In Fig. 9 the tool is shown as boring a four-sided bore with four curved sides, thus illustrating the effect of merely changing the relation of the cutting-edge of the tool and the guide F, for in Fig. 9 the axis of the tool is as near the axis of the stock as it can be during a rotation when the outer end of the cutting-edge is at a corner of the bore, (instead of being as far away as it can be during a rotation, as in Fig. 8.) The axis of the tool is then moved gradually away from the axis of the stock as the tool rotates, thus causing the cutting-edge to follow one-half of one of the curved sides of Fig. 9, and thence the axis of the tool is gradually moved toward the axis of the stock, the cutting-edge following the other half of that curved side of Fig. 9 until the outer end of the cutting-edge is at the second corner of Fig. 9. It will now be clear that guide F need not be four-sided, but may be of a large variety of shapes, and also that any one guide F will itself produce a variety of shapes of bore, depending upon the relation of the cutting-edge of the tool with the guide. It will also be clear that the adjustment of the axis of the tool with relation to the axis of the stock is important, and for this reason I use a tool-holder $g$, connected to the carrier D so that it may be accurately adjusted upon the carrier, and this is the second feature of my invention above referred to.

I prefer to use ways $g'$ $g^2$ ($g^2$ being adjustable, as explained, in relation to way $d'$) on carrier D, which engage grooves in tool-holder $g$, so that a screw $g^3$, mounted in carrier D and engaging with holder $g$ as a nut can be used to adjust holder $g$ with relation to carrier D, thereby adjusting axis of tool G with relation to axis of stock A.

It will be obvious that many changes of construction may be made not only as to the devices for adjusting tool-holder $g$ on carrier D, but also as to other devices; but it will nevertheless be clear that the two features of my invention above described will be found in any apparatus which contains first a rotating tool-stock, a carrier moving crosswise thereon, and a guide giving this motion to the carrier as the tool-stock and carrier rotate, and, secondly, these parts and a tool-holder adjustable on the carrier.

I prefer to form the guide F with a number of grooves, gradually of less perimeter, as shown, and to make the stud $d^2$ adjustable to enter either of these grooves.

My machine is also well adapted to trimming off bolts and bolt-heads, as illustrated in Fig. 10, where $h$ represents a round bar and where the tool rotates about this bar, its axis being at its extreme distance from the axis of the stock when the inner end of the cutting-edge is at its extreme distance from the axis of stock A, the axis of the tool being gradually moved nearer the axis of the stock while cutting one half of one side, and then gradually moved farther away from the axis of the stock while cutting the other half of that side until the inner end of the cutting-edge is near the next corner, as will be clear without further description.

It is not essential that the guide be cup-shaped, for it may be the converse, as if the hub of the guide shown were itself the guide; but in this case the springs which keep the stud $d^2$ and guide in contact must do more work than in the form shown.

What I claim as my invention is—

1. The boring-machine described, made up of a stock, a carrier on ways crosswise of the stock, and a guide to control the motions of the carrier, all organized for operation substantially as described.

2. In combination, a tool-stock, a carrier, a guide, a tool-holder, and means for adjusting the tool-holder, and means for adjusting the tool-holder in the carrier, substantially as described.

WILLIAM JOHN SMITH.

Witnesses:
EDWARD S. BEACH,
JOHN R. SNOW.